(12) United States Patent
Agrawal

(10) Patent No.: US 8,832,042 B2
(45) Date of Patent: Sep. 9, 2014

(54) METHOD AND SYSTEM TO SCAN DATA FROM A SYSTEM THAT SUPPORTS DEDUPLICATION

(75) Inventor: Mukund Agrawal, Pune (IN)

(73) Assignee: Symantec Corporation, Mountain View, CA (US)

( * ) Notice: Subject to any disclaimer, the term of this patent is extended or adjusted under 35 U.S.C. 154(b) by 325 days.

(21) Appl. No.: 12/724,235

(22) Filed: Mar. 15, 2010

(65) Prior Publication Data

US 2011/0225129 A1 Sep. 15, 2011

(51) Int. Cl.
*G06F 17/30* (2006.01)
(52) U.S. Cl.
CPC .............................. *G06F 17/30156* (2013.01)
USPC ........................................................ 707/692
(58) Field of Classification Search
CPC ............................................... G06F 17/30156
USPC .................................. 707/693, 692
See application file for complete search history.

(56) References Cited

U.S. PATENT DOCUMENTS

| | | | | |
|---|---|---|---|---|
| 5,990,810 | A * | 11/1999 | Williams | 341/51 |
| 7,814,149 | B1 * | 10/2010 | Stringham | 709/203 |
| 8,171,063 | B1 * | 5/2012 | Janakiraman et al. | 707/822 |
| 8,347,388 | B1 * | 1/2013 | Dutch et al. | 726/24 |
| 2005/0132206 | A1 * | 6/2005 | Palliyil et al. | 713/188 |
| 2009/0132616 | A1 * | 5/2009 | Winter et al. | 707/204 |
| 2009/0164522 | A1 * | 6/2009 | Fahey | 707/104.1 |

OTHER PUBLICATIONS

Quantum Corporation, DXi-Series Disk Backup Systems with Data De-Duplication, 2007.*

* cited by examiner

*Primary Examiner* — William Spieler
(74) *Attorney, Agent, or Firm* — Wilmer Cutler Pickering Hale and Dorr LLP

(57) ABSTRACT

An interface is disclosed that makes information obtained from a file deduplication process available to an application for the efficient operation thereof. A data deduplication repository is scanned to determine a plurality of file segments and respective checksum values associated with the segments. A data structure is generated that allows shared segments to be identified by indexing using a common checksum value. The segments also indicate the file to which they belong and may also include a timestamp value. This data structure is updated as files are modified, etc. The data structure is accessible to an application program so that the application program can readily determine which segments are shared between multiple files. With this information, the application can efficiently process the segment once rather than multiple times. Timestamps can be used by the application to efficiently identify only those segments that were accessed after a given time.

20 Claims, 9 Drawing Sheets

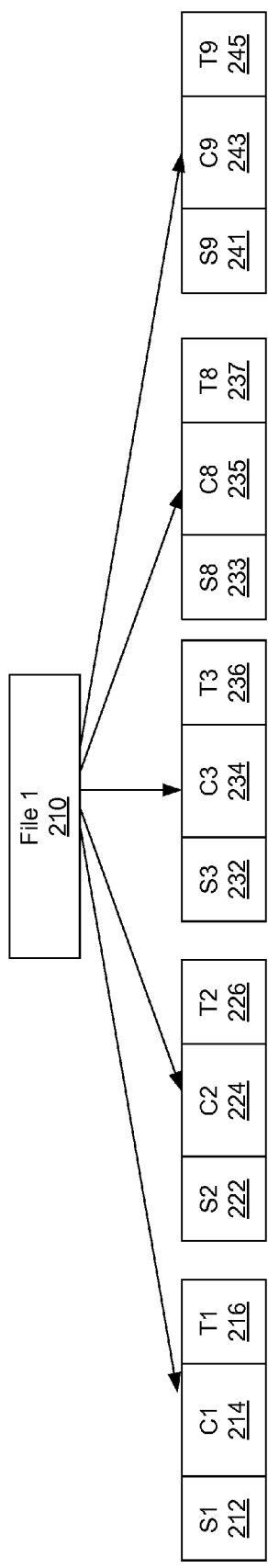
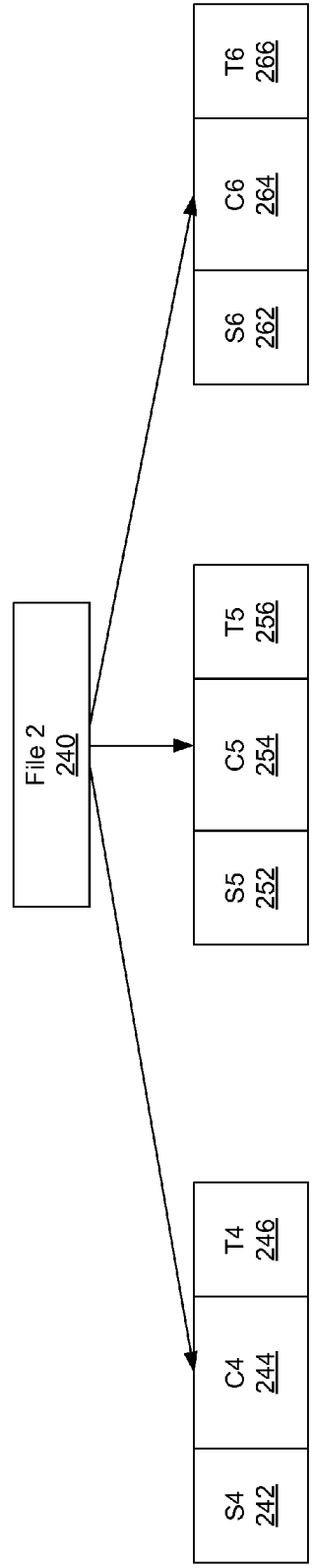
Fig. 2A
Fig. 2B

METHOD AND SYSTEM TO SCAN DATA FROM A SYSTEM THAT SUPPORTS DEDUPLICATION

TECHNICAL FIELD

Embodiments of the present invention generally relate to computer systems that provide data deduplication functionality.

BACKGROUND

In general, software applications read data by sending file requests to a file system or file system interface. The data is then processed in some fashion by the application. Files often contain portions that are duplicates of other file portions. As a result, applications may read and process duplicate files or duplicate regions within the files multiple times. Unfortunately, reading and processing duplicate files or regions within the files increases disk usage, processing power, and memory consumption.

Recently, file systems have been used to deduplicate files and content in order to detect identical files or identical portions of a file. Identification of identical portions of one or more files can be used to maintain a single copy of the content instead of maintaining multiple copies of the same content. Thus, duplicate files or regions within files may be reduced to a single footprint instead of multiple footprints, thereby reducing storage requirements. Deduplication has therefore been used to reduce memory storage requirements (and network data transfers) within a file system. Deduplication occurs at many places in the enterprise storage, e.g., right from online file systems to backup and archival systems.

There are many applications that need to scan the file system and process the data in bulk, some examples include antivirus scans, keyword search engines, data classification applications for e-discovery, data leak prevention applications, archival applications, backup applications, replication engines or even plain data migration applications. Today, if the same segment of data is shared by 10 different files, then these applications are required to process this segment 10 different times, even though a data deduplication program has previously detected that this segment is shared by the files.

In other words, file system deduplication processes keep internal the information regarding which files and which file portions are duplicated. The file system deduplication processes do not provide this internal information to outside applications. Typically, the solution has been to expect the application to check if it has already processed the same data, and if yes, to skip the data. For example, the same way as source based deduplication checks if the data is already present with the backup target and if yes, it will not send the data over the network.

To partially address this, some applications build their own respective index to track contents that have been read and processed. Unfortunately, each application is required to track this information individually because conventional file system deduplication processes keep internal information regarding which files and which file portions are duplicated and processed. Requiring each application to independently maintain such an index is burdensome on the application, increases resource usage and decreases processing efficiency.

Requiring applications to track their own data usage is not only burdensome but it is also a poor solution for the following rationale. Consider a keyword indexing engine that scans all the data in a backup or archival image, and constructs an index which can be used to do a keyword search. Assume also that it scans a segment S for a file A, and finds a list of keywords K in the segment, and enters combinations of (K, A) in an inverted index. This segment, S, is also shared by file B which is encountered when the engine scans file B. Now, even if the engine knows that it has already processed this segment, the engine nevertheless cannot skip the data because it again needs to read segment S, again find those keywords K, and then enter combinations of (K, B) in the inverted index.

SUMMARY OF THE INVENTION

Accordingly, a need has arisen to provide an application and interface to track shared regions between multiple files as discovered by deduplication processing thereof. The application and interface, relieve an application from maintaining and tracking the regions that are shared and that may have been processed previously by the application. The interface advantageously exposes shared regions between multiple files to an external or outside application requesting access to those shared regions. As a result, resource utilization within the system is improved by reducing application processing and bandwidth consumption. It will become apparent to those skilled in the art after reading the detailed description of the present invention that the embodiments of the present invention satisfy the above mentioned needs.

In one embodiment, a deduplication repository includes an iterator interface to return regions of a file one after another. Utilizing the iterator interface ensures that each region of the storage system is scanned once. The deduplication repository provides an iterator interface that returns regions one after another. With each region, the interface provides the list of objects (e.g., files) that share this region. From this, a data structure is automatically configured (and updated over time) that is made available to any application that requests such data. In alternative embodiments, a timestamp is associated with each region to indicate the time the region was last updated.

Therefore, an external application accessing this data structure can determine shared regions and/or determine if it has previously processed a given region and therefore the application can make efficient processing decisions from this information. To increase efficiency, timestamps may be used by an application for identifying only those entries within the interface that have been updated after a given time. Embodiments of the present invention advantageously free an application from maintaining any state of what regions it has already processed, etc. In other words, the interface, relieves external applications from maintaining and tracking the regions that are shared.

More specifically, according to one embodiment, a method of providing file information relating to data deduplication includes accessing a plurality of files that includes a plurality of file segments ("segments"). A data repository operable to store data resultant from a file deduplication process is accessed. A plurality of checksum values associated with the plurality of segments is obtained when the data repository is accessed.

According to one embodiment, segments of the plurality of files having a same checksum value are identified. A data association structure is automatically generated by associating the segments of the plurality of files having the same checksum value with one another. The checksum values are operable as an index into the data association structure for obtaining segments having the same checksum value. The data association structure may be stored in computer memory and operable to be accessed by an application program for efficient operation thereof.

According to one embodiment, within the data association structure, each segment indicates the file to which the segment is associated. It is appreciated that in one exemplary embodiment, the data repository is accessed to identify a new checksum value associated with an altered segment of the plurality of segments. The data association structure is updated based on the new checksum value to form an updated data association structure. In one embodiment, the updated data association structure is stored back to memory.

In one embodiment, a plurality of respective time stamps associated with the plurality of segments is accessed from the data repository. Each respective time stamp indicates a last time an associated segment was altered. According to one embodiment, the data association structure further includes the plurality of time stamps associated with the plurality of checksum values.

According to one embodiment, a new time stamp associated with an altered segment of the plurality of segments is accessed from the data repository. The data association structure is updated to form an updated data association structure. The updated data association structure may be stored back to memory.

In one embodiment, the method of providing file information relating to data deduplication may further include accessing a new file that includes a plurality of segments. A plurality of respective checksum values associated with the plurality of segments of the new file is accessed from the data repository. Segments of the new file and segments of the plurality of files having a same checksum value are identified. Segments having a same checksum value to one another are associated based on the identifying segments of the new file and segments of the plurality of files having a same checksum value to form an updated data association structure. The updated data association structure may be stored back to memory.

Another embodiment of the present invention includes a computer readable storage medium having stored thereon, computer executable instructions that, if executed by a computer system cause the computer system to perform a method of providing file information relating to data deduplication, the method includes accessing a plurality of files including a plurality of segments and accessing a data repository storing data resultant from a file deduplication process operable within the computer system. A plurality of checksum values associated with the plurality of segments is accessed. The method further includes identifying segments of the plurality of files having a same checksum value and automatically generating a data association structure by associating the segments of the plurality of files having the same checksum value with one another. Within the data structure, checksum values are operable as an index into the data association structure for obtaining segments having the same checksum value. Furthermore, within the data association structure, each segment indicates a respective file to which each segment is associated and the method further includes storing the data association structure in computer memory operable to be accessed by an application program for efficient operation thereof.

Another embodiment of the present invention includes a method of providing information relating to a deduplication process, the method including generating a segment index data structure responsive to performing a data deduplication process on a plurality of files of a file system wherein the plurality of files comprise a plurality of segments and wherein the segment index data structure comprises a listing of unique segments within the plurality of segments. The method further includes receiving a request from a requesting application for segment information and responsive to the request, scanning the segment index data structure; and responsive to the scanning, supplying segment information to the requesting application.

Embodiments include a method as described above wherein the request includes an application timestamp indicating a last time the requesting application processed data within the file system and wherein further the scanning comprises scanning only respective segments of the segment index data structure having respective timestamps that are after the application timestamp.

Embodiments includes a method as described above wherein the segment information comprises, for each respective segment, a segment identifier and a list of files to which the respective segment belongs and further comprising the requesting application using the segment information to determine whether or not to process respective segments.

Embodiments include methods as described above wherein the scanning and the supplying are performed iteratively and wherein the unique segments are identified by respective unique checksum values and wherein further the segment index data structure resides within a repository unit of a data deduplication unit.

BRIEF DESCRIPTION OF THE DRAWINGS

FIGS. 2A, 2B, 2C, and 2D show data structures for providing information associated with a deduplication process in accordance with one embodiment of the present invention.

DETAILED DESCRIPTION

Figure 1:
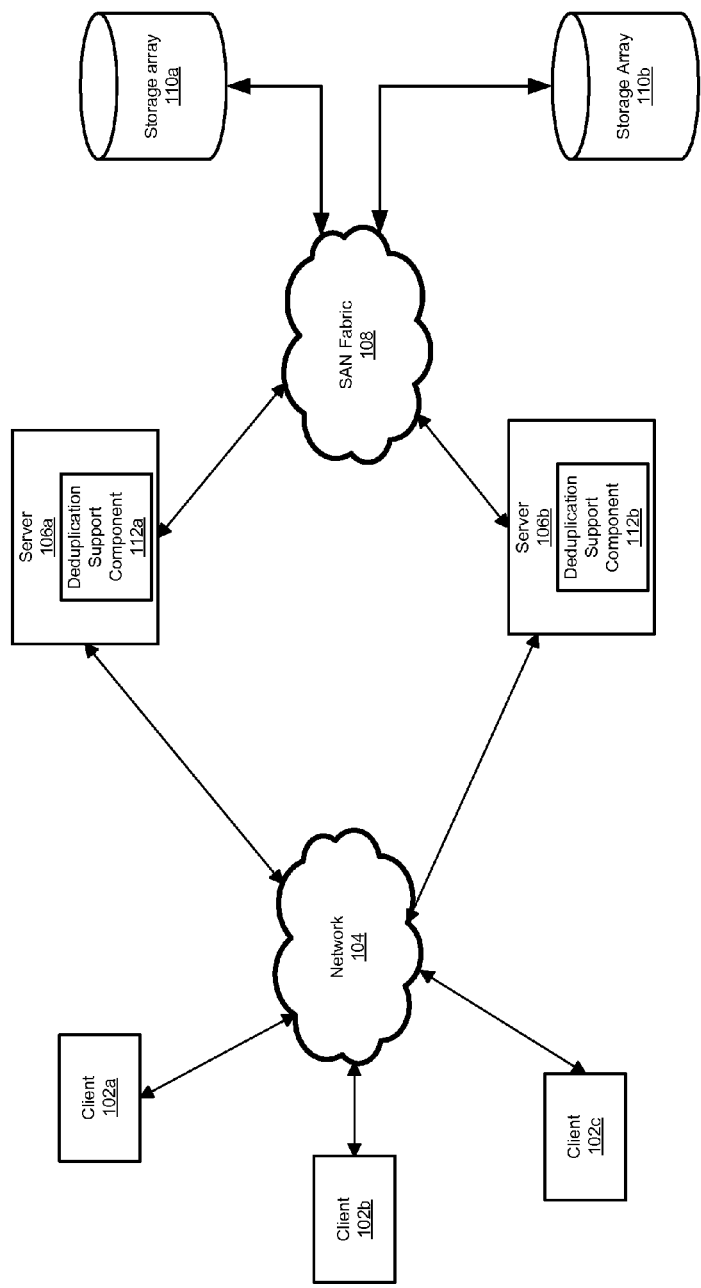
FIG. 1 shows a block diagram of an exemplary operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "storing," "sending," "determining," "providing," "updating," "accessing," "associating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment, in accordance with one embodiment of the present invention. Exemplary operating environment 100 includes clients 102*a-c*, networks 104, servers 106*a-b*, storage area network (SAN) fabric 108, and storage arrays 110*a-b*. It is appreciated that that components of exemplary operating environment 100 are exemplary and more or fewer components may be present in various configurations. It is appreciated that operating environment may be part of a distributed computing environment, a cloud computing environment, a client server environment, etc.

Client systems 102*a-c* access information on storage arrays 110*a-b* via servers 106*a-b* using, for example, a web browser or other suitable client communication software (not shown). FIG. 1 depicts the use of a network 104 such as the Internet for exchanging data, but the present disclosure is not limited to the Internet or any particular network-based environment.

Each of servers 106*a-b* can have multiple clients (e.g., clients 102*a-c*) connected thereto. Servers 106*a-b* can be a variety of server types including, but not limited to, database servers, network file system (NFS) servers, and application servers. In some embodiments, servers 106*a-b* have access to shared storage of storage arrays 110*a-b* with each of servers 106*a-b* having its own respective clustered file system and its own built-in lock manager thereby allowing servers 106*a-b* to access the shared storage. Each of servers 106*a-b* may communicate with each other over a network (e.g., a redundant private network) (not shown). Servers 106*a-b* may be linked to storage arrays 110*a-b* in a variety of ways including, fibre channel.

Servers 106*a-b* may respectively use deduplication support components 112*a-b* to provide file information relating to data deduplication. The deduplication support components 112*a-b* access a plurality of files comprising a plurality of segments and access a plurality of checksum values associated with the plurality of segments. The deduplication support components 112*a-b* identify segments of the plurality of files having a same checksum value. The deduplication support components 112*a-b* generate a data association structure by associating the segments of the plurality of files having the same checksum value with one another. A checksum value is operable as an index into the data association structure for obtaining segments having the same checksum value. The data association structure is stored in computer memory for subsequent access by an application program for efficient operation thereof. The deduplication components 112*a-b* track changes to a segment and update a corresponding checksum value. As a result, the data structure is automatically configured (and updated over time) that is made available to any application that requests such data. In alternative embodiments, a timestamp is associated with each region to indicate the time the segment was last updated.

Therefore, an external application accessing this data structure can scan regions one after another to ensure that regions are scanned at least once. It is appreciated that the external application may query this data structure to determine shared regions and/or determine if it has previously processed a given region and therefore the application can make efficient processing decisions from this information. To increase efficiency, timestamps may be used by an application for identifying only those entries within the interface that have been updated after a given time. Embodiments of the present invention advantageously free an application from maintaining any state of what regions it has already processed, etc. In other words, the interface, relieves external applications from maintaining and tracking the regions that are shared.

FIGS. 2A, 2B, 2C and 2D illustrate data structures that are automatically constructed by embodiments of the present invention to indicate which segments of which files share the same content, as determined by running data deduplication processes on the files of the file system. As will be described further herein, the results of the data deduplication processes are stored in a data repository, which is accessed to obtain the information required to construct these data structures.

Figures 2C, 2D:
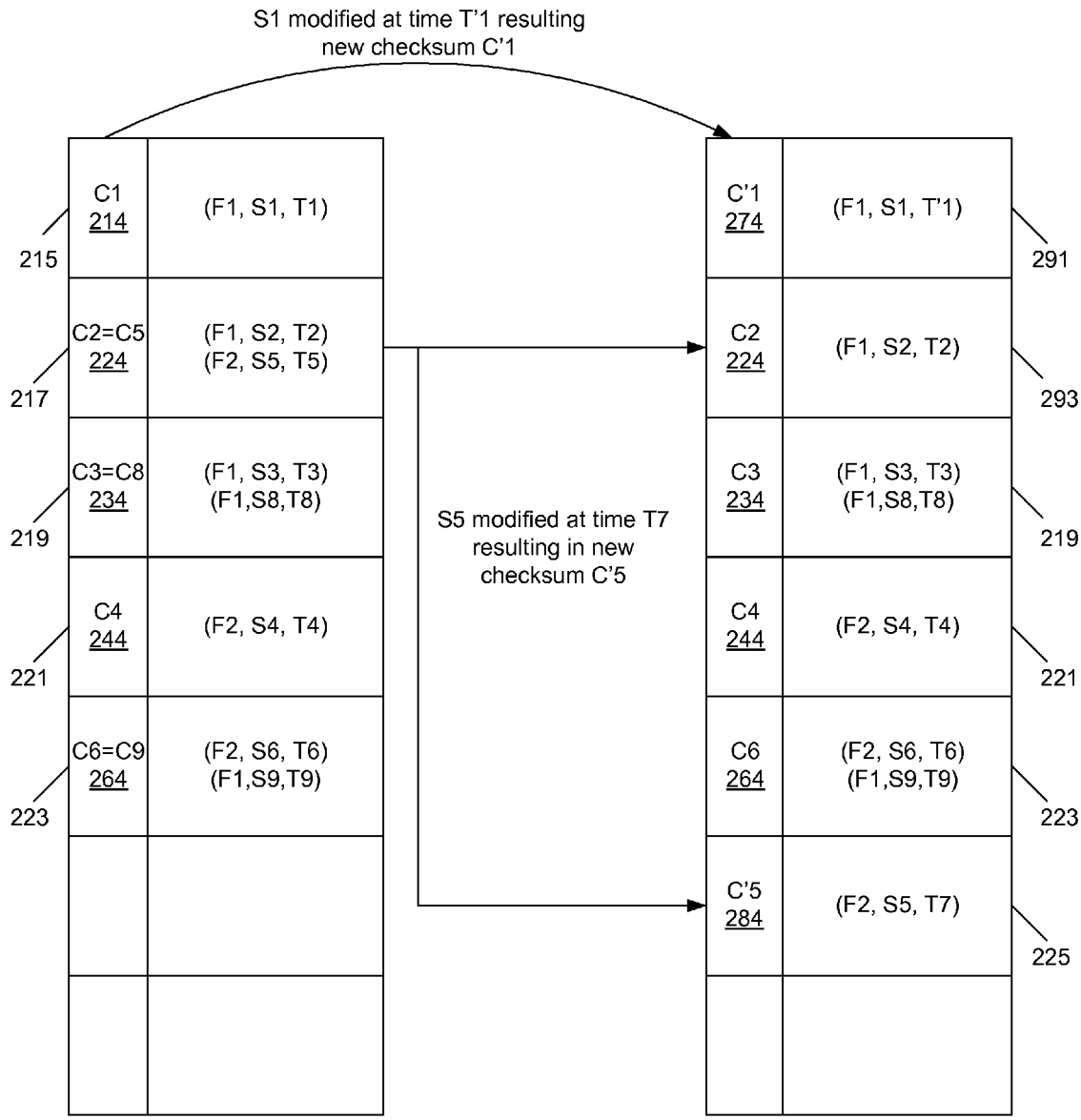

Referring now to FIGS. 2A, 2B, 2C, and 2D, data structures for providing information associated with a deduplication process in accordance with one embodiment of the present invention are shown. With reference to FIG. 2A, file 210 includes a plurality of segments 212, 222, 232, 233, and 241. It is appreciated that a file may include any number of segments and showing five segments is exemplary and not intended to limit the scope of the present invention.

Each segment of the file 210 includes a corresponding data content. Performing a checksum operation on each segment of the file 210 generates a checksum value, e.g., checksum values 214, 224, 234, 235, and 243 that are associated with segments 212, 222, 232, 233, and 241 respectively. It is appreciated that a timestamp may be associated with each segment where the timestamp indicates a last time a segment has been altered. For example, timestamps 216, 226, 236, 237, and 245 indicate a last time segments 212, 222, 232, 233, and 241 have been altered respectively. In one embodiment, data deduplication processes generate the checksum values and the timestamps may be obtained from the file system.

With reference to FIG. 2B, file 240 includes a plurality of segments 242, 252, and 262. It is appreciated that a file may include any number of segments and showing three segments is exemplary and not intended to limit the scope of the present invention.

Each segment of the file 240 includes a corresponding data content. Performing a checksum operation on each segment of the file 240 generates a checksum value, e.g., checksum values 244, 254, and 264 that are associated with segments 242, 252, and 262 respectively. It is appreciated that a timestamp may be associated with each segment where the timestamp indicates a last time a segment has been altered. For example, timestamps 246, 256, and 266 indicate a last time segments 242, 252, and 262 have been altered respectively.

Referring now to FIG. 2C, generation of a data association structure in accordance with one embodiment of the present invention is shown. In accordance with embodiment of the present invention, segments having a common checksum value are associated with each other within the data structure.

It is appreciated that a checksum value may be used as an index that associates the checksum value with all the segments that share that same checksum value. For example, a first entry 215 of the table shows the checksum value 214 as an index associated with segment 212 of file 210 and time stamped 216, represented as (F1,S1,T1). As such, the segment 212 indicates a respective file 210 to which it is associated.

For illustration purposes it is presumed that segment 222 of file 210 and segment 252 of file 240 have a same content. Thus, checksum values 224 and 254 are the same (C2=C5) because their respective segments include the same content. A second entry 217 shows the checksum value 224 as an index associated with segment 222 of file 210 and time stamped 226, represented as (F1,S2,T2). The checksum value 224 is further associated with segment 252 of file 240 and time stamped 256, represented as (F2,S5,T5). In other words, segments 222 and 252 that have the same checksum value 224 and are associated with one another within the data structure.

In a similar fashion, other checksum values are used as an index for association with various segments of various files. For example, a third entry 219 of the table shows that the checksum values 234 and 235 are the same (C3=C8) because their respective segments 232 and 233 include the same content. The checksum value 234 (C3=C8) is used as an index associated with segments 232 and 233 of file 210 and time stamped 236 and 237 respectively, represented as (F1,S3,T3) and (F1,S8,T8) respectively. A fourth entry 221 of the table shows the checksum value 244 as an index associated with segment 242 of file 240 and time stamped 246, represented as (F2,S4,T4). A fifth entry 223 of the table shows that the checksum values 264 and 243 are the same (C9=C6) because their respective segments 241 and 262 include the same content. The checksum value 264 (C6=C9) is used as an index associated with segment 262 of file 240 and time stamped 266 and further associated with segment 241 of file 210 and timestamped 245, represented as (F2,S6,T6) and (F1,S9,T9) respectively.

According to one exemplary embodiment, the contents of the data structure are modified in respond to a segment of a file being altered or changed. For example, segment 212 of the file 210 may be changed. Thus, the checksum value 214 associated with segment 212 is updated and accessed as represented by checksum value 274. It is appreciated that the last time a change to the segment 212 has been made is indicated by timestamp T'1. The new checksum value 274 is cross checked with other checksum values to find a match. If no match is found, then the checksum value 274 is associated with segment 212 of file 210 time stamped at T'1. If a match is found, then the new checksum value 274 is associated with other checksum values and other segments accordingly.

In this example, it is presumed that the new checksum value 274 does not match any other checksum value. As such, the entry 215 may be updated to entry 291 and the checksum value 274 is associated with (F1,S1,T'1). Thus, the data association structure is updated as changes to various segments are made.

In this exemplary embodiment, it is presumed that segment 252 is modified. Thus, the checksum value 254 associated with segment 252 is changed to a new checksum value 284. Accordingly, the checksum value 224 is no longer the same as the checksum value 254. Thus, the checksum value 224 is no longer associated with segment 252. Accordingly, the entry 217 is updated to entry 293 such that the checksum value 224 is associated with segment 222 of the file 210 time stamped at T2, represented as (F1,S2,T2). In other words, in response to a change to segment 252 of file 240, the checksum value 224 is disassociated from the segment 252.

In this example, it is presumed that entries 219, 221, and 223 remain unaltered and therefore remain unchanged. However, as presented above, segment 252 of file 240 has been altered and therefore disassociated from entry 217. The new checksum value 284 of segment 252 is cross checked with other checksum values to find a match. The checksum value 284 is associated with other checksum values and other segments associated therein if the checksum value 284 matches a checksum value of another segment. However, a new entry 225 is created if the checksum value 284 does not match another checksum value. In this example, the entry 225 is created where the checksum value 284 is associated with segment 252 of file 240 and time stamped at T7.

Accordingly, the data association structure is maintained and updated as changes to file segments are made. In one embodiment, the data association structure is stored in a memory component and is automatically configured (and updated over time) that is made available to any application that requests such data. The changes to segments are represented as a new checksum value and a new time stamp that indicates the last time a change to a given segment has been made. It is appreciated that the data association structure presented may be listed in chronological ordering of the time stamp, e.g., in increasing order or decreasing order.

Referring now to FIG. 2D, a data structure which provides the association of each file with segments of a file is shown. For example, file F1 is indicated as having five segments, S1, S2, S3, S8, and S9 file F2 is indicated as having segments S4, S5, and S6, file F3 is indicated as having segments, S11, S12, . . . , S21, and file FN is indicated as having segments Si, . . . , Sj. The association of each file with various segments may also be stored in a memory component.

Figure 3A:
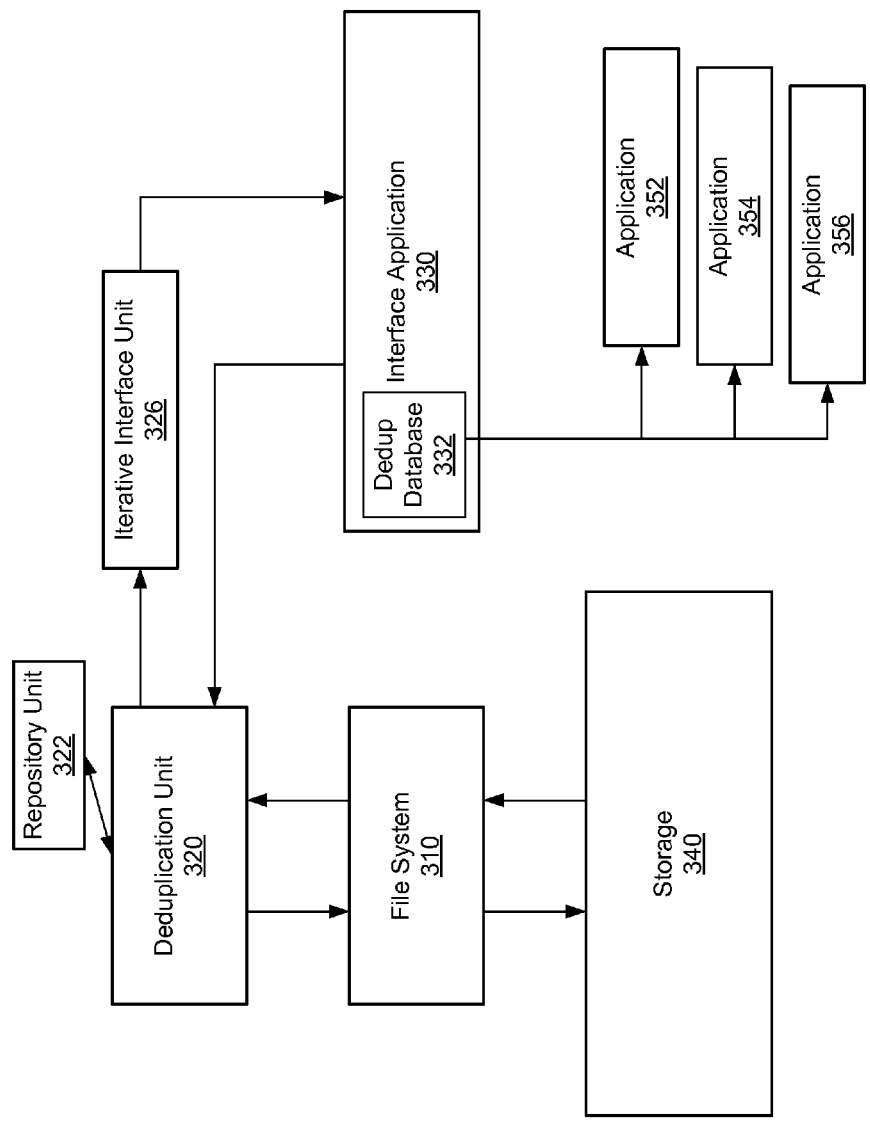
FIG. 3A shows a block diagram of system comprising a deduplication environment in accordance with another embodiment of the present invention.

Referring now to FIG. 3A, a block diagram of an exemplary system 300 comprising a deduplication environment in accordance with an embodiment of the present invention is shown. System 300 includes a file system 310, a deduplication unit 320, a storage unit 340, an interface application 330 in accordance with an embodiment of the present invention, and a plurality of external applications 352, 354, and 356. External applications can be of any nature, for instance, anti-virus scans, keyword search engines, data replication engines, data migration engines, data classification engines, data leak prevention engines, archival applications, backup applications, etc.

It is appreciated that various files, e.g., files 210 and 240 from FIGS. 2A-2D, may be periodically deduplicated using the deduplication unit 320. Any well known deduplication process can be used. The result of the deduplication, as is well known, is to identify file segments that contain the same data so as to reduce storage requirements across the file system. This information is placed into a repository unit 322. As a result, data structures associated with deduplication of each file may be created, as discussed above. The file system 310 may be used to create information regarding each file and its deduplication, e.g., size, date modified, segments within each file, etc. The file system 310 may also store a portion of this information at the storage unit 340.

In one embodiment, the file system 310 allows the deduplication unit 320 access to process the underlying files (storage) for performing file deduplication processing, the result of which includes creating a deduplication repository 322. For example, the deduplication repository information may be stored in a repository unit 322. The repository unit 322 is associated with the deduplication unit 320. It is appreciated that the repository unit 322 may be within the deduplication unit 320 or outside of the deduplication unit 320. The deduplication repository information may include information such as segments within each file, segments that contain the same information, checksum values, time stamps, etc., as presented above with respect to FIGS. 2A and 2B.

According to one exemplary embodiment, the information stored in the repository unit 322 is accessed by the interface application 330, in accordance with embodiments of the present invention, via an iterative interface unit 326. Scanning the information stored in the repository unit 322 and iteratively providing it to the interface application 330 ensures that each segment of the files of the file system is scanned at least once.

According to one embodiment, the interface application 330 uses the received information from the iterative interface unit 326 to generate a deduplication database 332. The interface application 330 automatically generates data association structures, as discussed above with respect to FIGS. 2C and 2D. The generated data association structures are stored in the deduplication database 332 and made available to applications.

A data association structure may be accessible by (or provided to) an application requesting access to a file or a file segment wherein a data association structure is associated with that file or segment thereof. For example, if the application 354 intends to access segment 222 of file 210 before timestamp T7, then the data association structure as represented by entry 217 can be accessed by the application to determine duplicate segments. As such, application 354 can determine that segment 222 of file 210 contains the same information as segment 252 of file 240. Data association structures associated with other segments of a file or files may be provided to the requesting application in a similar manner. Using this information, an application can perform efficient processing tasks by recognizing duplicate segments.

Therefore, an external application accessing this data association structure can determine shared regions and/or determine if it has previously processed a given region and therefore the application can make efficient processing decisions from this information. Moreover, the interface application 330 maintaining the data association structure frees an application from maintaining any state of what regions it has already processed, etc. In other words, the interface application 330, relieves external applications 352, 354, and 356 from maintaining and tracking the regions that are shared.

For instance, if a particular file segment is shared across 10 files, this information will be discovered by the data deduplication unit 320. This information will be stored in the repository 322 which is accessed by the interface application 330 and stored in a data structure in 332. Any application can therefore access this data structure to determine that the given segment is shared across 10 files. In accordance with embodiments of the present invention, an application, e.g., a virus-scan application, can then use this information so that the segment need only be fully processed once, for all 10 files, rather than being wastefully processed 10 separate times.

Figure 3B:
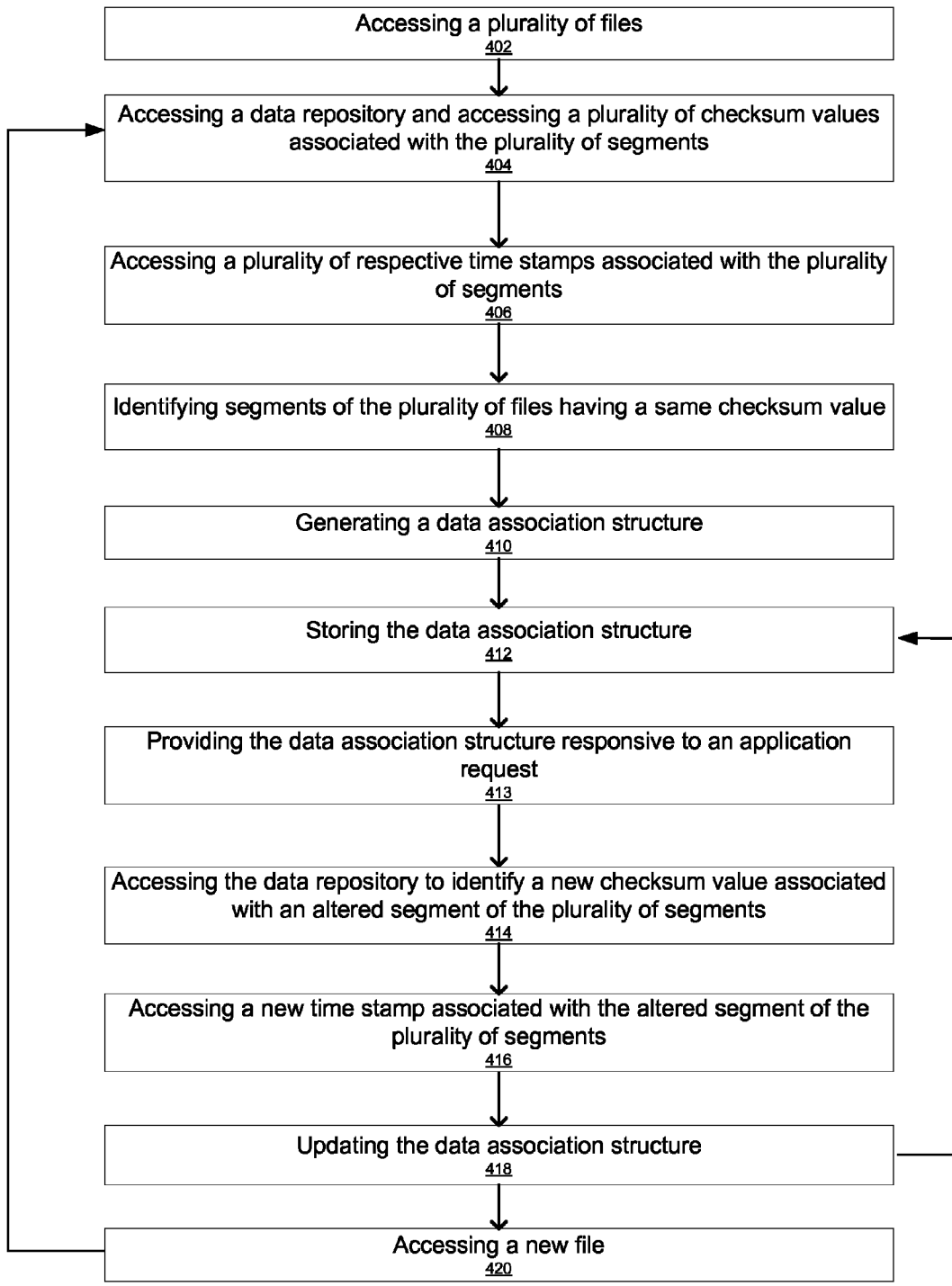
FIG. 3B shows an exemplary flow diagram for providing information associated with a deduplication process in accordance with embodiments of the present invention.

Referring now to FIG. 3B, an exemplary computer controlled flow diagram 400 for providing information associated with a deduplication process in accordance with embodiments of the present invention is shown. At step 402, a plurality of files 210 and 240 are accessed. Each file may contain a plurality of segments, e.g., segments 212, 222, 232, 233, and 241 of file 210 and segments 242, 252, and 262 of file 240. Each segment indicates a respective file to which it is associated with. For example, segment 232 indicates that it is associated with file 210.

At step 404, a data repository, e.g., repository unit 322, is accessed. The data repository contains results from a data deduplication process that is allowed to operate periodically. Any of a number of well known data deduplication processes can be used. Accessing the data repository provides access to a plurality of checksum values, e.g., checksums 214, 224, 234, 235, and 243 associated with the plurality of segments, e.g., segments 212, 222, 232, 233, and 241. It is appreciated that at an optional step 406, a plurality of respective timestamps, e.g., timestamps 216, 226, 236, 237, and 245 associate with the plurality of segments, e.g., segments 212, 222, 232, 233, and 241 may be similarly accessed. A timestamp indicates the last time that the timestamped segment has been altered.

The timestamp data stored within the data association structure may be used in the following way to increase performance. An application may store the latest timestamp that was present on the last time it accessed the data association structure. Upon a subsequent pass through the data association data structure, the application can limit its processing to only those entries having newer timestamps thereby increasing performance.

At step 408, segments of the plurality of files that have a same checksum value are identified and grouped together. For example, segments 222 and 252 at time stamp T2 and T5 are identified. At step 410, a data association structure is automatically generated, as presented above with respect to FIGS. 2C and 2D, that groups segments having a common checksum value. The data structure is indexed based on checksum. For example, the data association structure is generated by associating the segments of the plurality of files having the same checksum value with one another. It is appreciated that a checksum value may be used as an index into the data association structure for obtaining segments having that checksum value. For example, the checksum value 224 may be used as an index for entry 217 that correspond to segments 222 and 252. It is appreciated that the data association structure may further include time stamps associated with the plurality of checksum values, as discussed above with respect to FIG. 2C. Moreover, within the data association structure, respective segments may indicate the file to which they belong.

At step 412, the data association structure is stored in computer memory, e.g., deduplication database 332. Thus, the data association structure is available and may be accessed by external applications, e.g., applications 352, 354, and 356. At step 413, a portion of the data association structure is provided to (or accessed by) an application requesting access to a segment of a file that corresponds to the provided portion. At step 413, the application may use the information relating to common segments to increase processing efficiency thereof in a number of different manners. For instance, duplication segments of multiple different files may be skipped or not fully processed assuming they were fully processed at least one.

At step 414, the data repository may be periodically accessed to identify a new checksum value associated with an altered segment of the plurality of segments. For example, a new checksum value 274 associated with the altered segment 212 is accessed. At an optional step 416, the data repository may be accessed to obtain a new timestamp associated with the altered segment of the plurality of segments. For example, a new timestamp T'1 is obtained. At step 418, the data association structure is updated based on the new checksum value to form an updated data associated structure. It is appreciated that the updated data associated structure may further include the new timestamp. The updated data association structure may be stored.

It is appreciated that at step 420, a new file may be accessed. According to one embodiment, steps 404-412 may be repeated to generate a new data association structure and to update the existing data association structures.

It is appreciated that at any time within the steps of process 400, the data deduplication process 320 may be allowed to periodically operate to update contents of the data duplication repository 322.

Figure 4A:
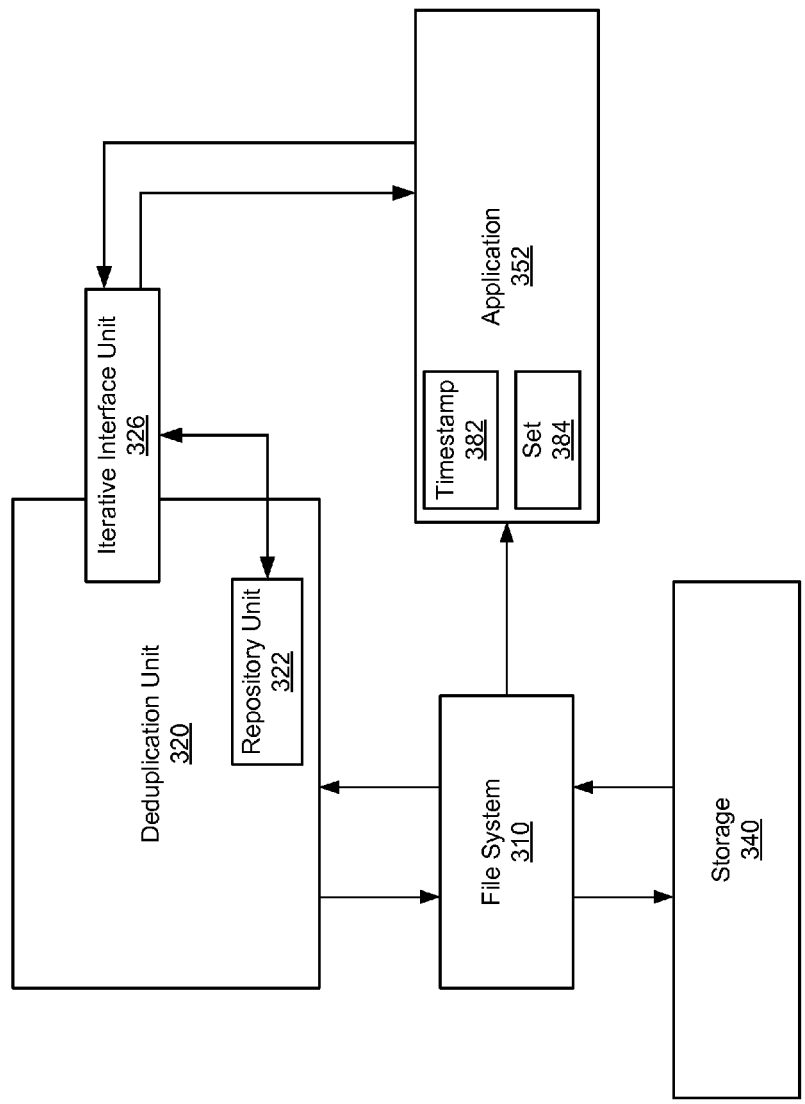
FIG. 4A shows a block diagram of system comprising a deduplication environment in accordance with an alternative embodiment of the present invention.
Figure 4B:
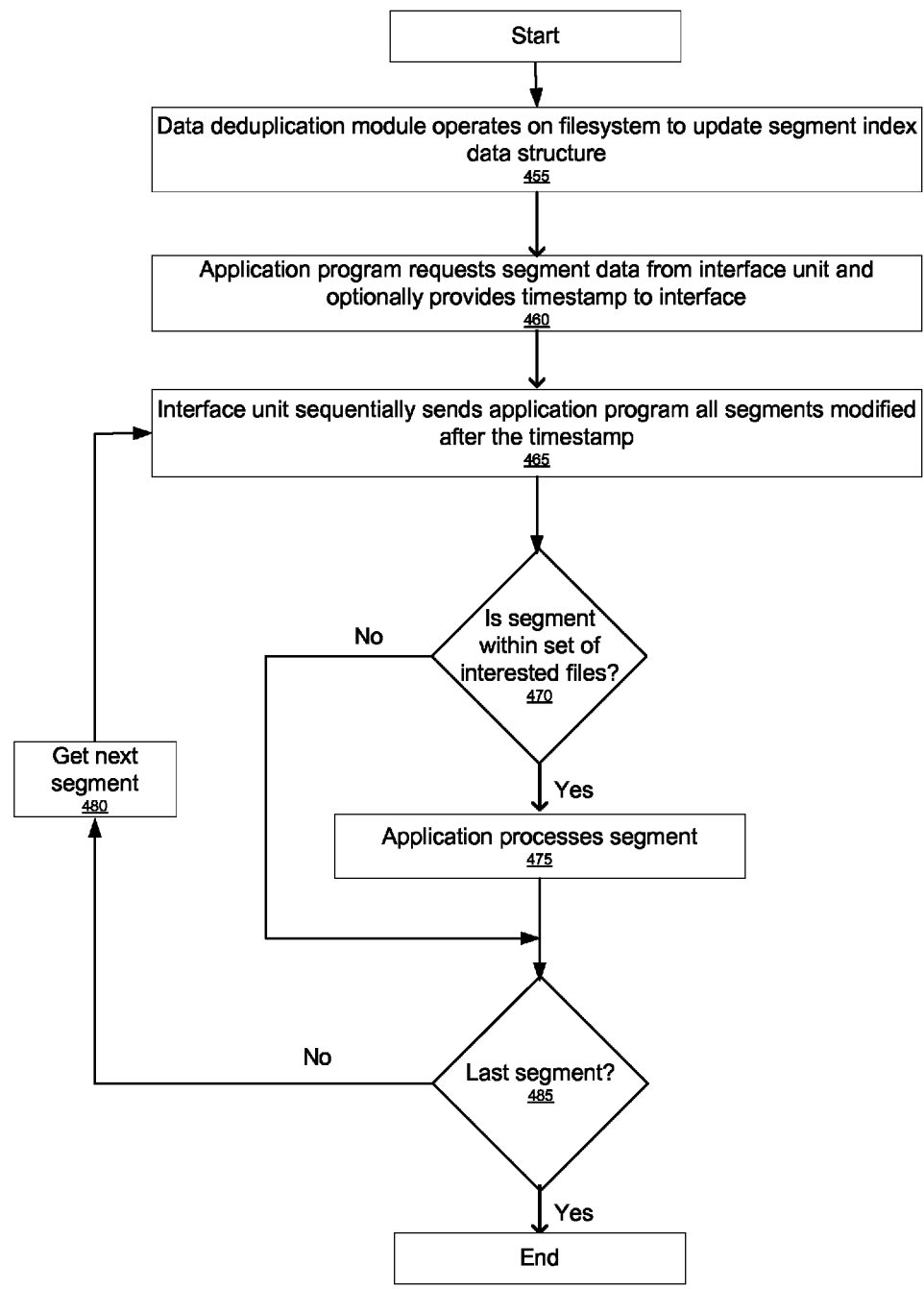
FIG. 4B shows an exemplary flow diagram for providing information associated with a deduplication process in accordance with an alternative embodiment of the present invention.

FIG. 4A and FIG. 4B illustrate an alternative embodiment of the present invention in which the segment index data structure and file data structure, e.g., as shown in FIG. 2C and FIG. 2D, are maintained within the deduplication unit 320. In this embodiment, an external application (e.g., application 330 of FIG. 3A) is not required to maintain and supply information regarding these data structures. Rather, the iterative interface unit 326 is able to directly access these data structures and supply information based thereon to a requesting application.

For instance, with reference to FIG. 4A, a system 350 is shown having a file system 310, a storage unit 340 and a deduplication unit 320 which stores results of its processing in a repository unit 322. In this embodiment, the data structures described in FIG. 2C and FIG. 2D are automatically generated and/or updated by the data deduplication unit 320 and stored within the repository unit 322. In accordance with embodiments of the present invention, an iterative interface unit 326 is provided within the deduplication unit 320 and is operable to scan these data structures to provide segment information therefrom to a requesting application program, e.g., application 352. In this fashion, the application 352 is guaranteed to receive no duplicated segments from the interface unit 326 because interface unit 326 obtains its information from the segment index that contains only unique segments. Therefore, an application 352 can efficiently process segments of the file system 310 without encountering duplicate segments, even if a duplicate segments is shared across multiple files. It is appreciated that in one embodiment, the interface 326 supplies segment identifiers to the application program 352 and the segment data itself is accessed by the application 352 via the file system 310.

The requesting application program 352 can be any application at all, e.g., antivirus scans, keyword search engines, data classification applications for e-discovery, data leak prevention applications, archival applications, backup applications, replication engines or even plain data migration applications. The application 352 can be any application that needs to read data from file system 310 and processing the data in some fashion.

In accordance with one embodiment of the present invention, the application 352 can supply the interface 326 with a timestamp 382 indicating the last time it processed data within the file system 310. In this embodiment, the interface can limit the segments it provides to the application 352 to only those that were modified after the timestamp thereby allowing effective incremental processing of the application program 352. In one embodiment, the segment data structure (FIG. 2C) may be sorted itself according to the respective timestamps of the segments therein, e.g., sorted according the last time a segment was modified/created. In this case, scanning the segment index is made easier since only entries that were updated after the timestamp 382 need to be scanned (and supplied to the application 352) and these entries should be all located together since the segment index data structure is sorted by timestamp.

In accordance with yet another embodiment of the present invention, the application program 352 may contain a subset 384 of files in which it is interested. In effect, the application program 352 may not want to process all the files within file system 310. Alternatively, subset 384 may be a list of files to exclude from processing. In any event, a subset 384 will define files that need processing by application 352 (either by inclusion or exclusion). In this embodiment, the interface unit 326 iteratively supplies not only a segment identification of a respective segment, but also a listing of all files to which the respective segment belongs (see FIG. 2C). In this embodiment, the application program 352 can use the file identification received from unit 326 and the subset definition 384 to determine if the respective segment needs to be processed or skipped. In this fashion, only certain files are processed by application 352.

It is also appreciated that timestamp 382 can be used in conjunction with subset 384 so that the application program 352 can effectively perform incremental processing on only selected files regarding file system 310.

FIG. 4B illustrates a flow diagram of a process 450 in accordance with embodiments of the present invention shown in FIG. 4A. Process 450 of FIG. 4B is a computer controlled process. At step 455, a data deduplication unit or module 320 operates on the files of file system 310 to create or modify a segment index data structure of the type shown in FIG. 2C and a file data structure shown in FIG. 2D. These data structures are stored in repository unit 322. It is appreciated that any of a number of well known deduplication processes can be performed at step 455.

At step 460, a requesting application program 352 makes a request to interface unit 326 for segments within file system 310. This request may optionally include a timestamp 382 indicating the last time the application program 352 processed file system data. At step 465, the iterative interface unit will iteratively supply segments from the segment index data structure to the requesting application program 352. In one embodiment, only segments that have been created/modified after timestamp 382 are supplied by the interface 326. In one embodiment, not only is a segment identifier supplied by unit 326 but a list of files is also supplied indicating those files that share the respective segment.

At step 470 the application program 352 checks if the respective segment is part of the subset of interested files 384. If it is, then at step 475 the application program 352 obtains the segment data from file system 310 and processes the data. At step 485 a check is made if the last segment was supplied. If not, then at step 480 another segment is obtained from unit 326. At step 470, if the supplied segment is not part of the interested subset 384, then the application program 352 skips the segment and step 485 is entered effectively bypassing step 475.

Figure 5:
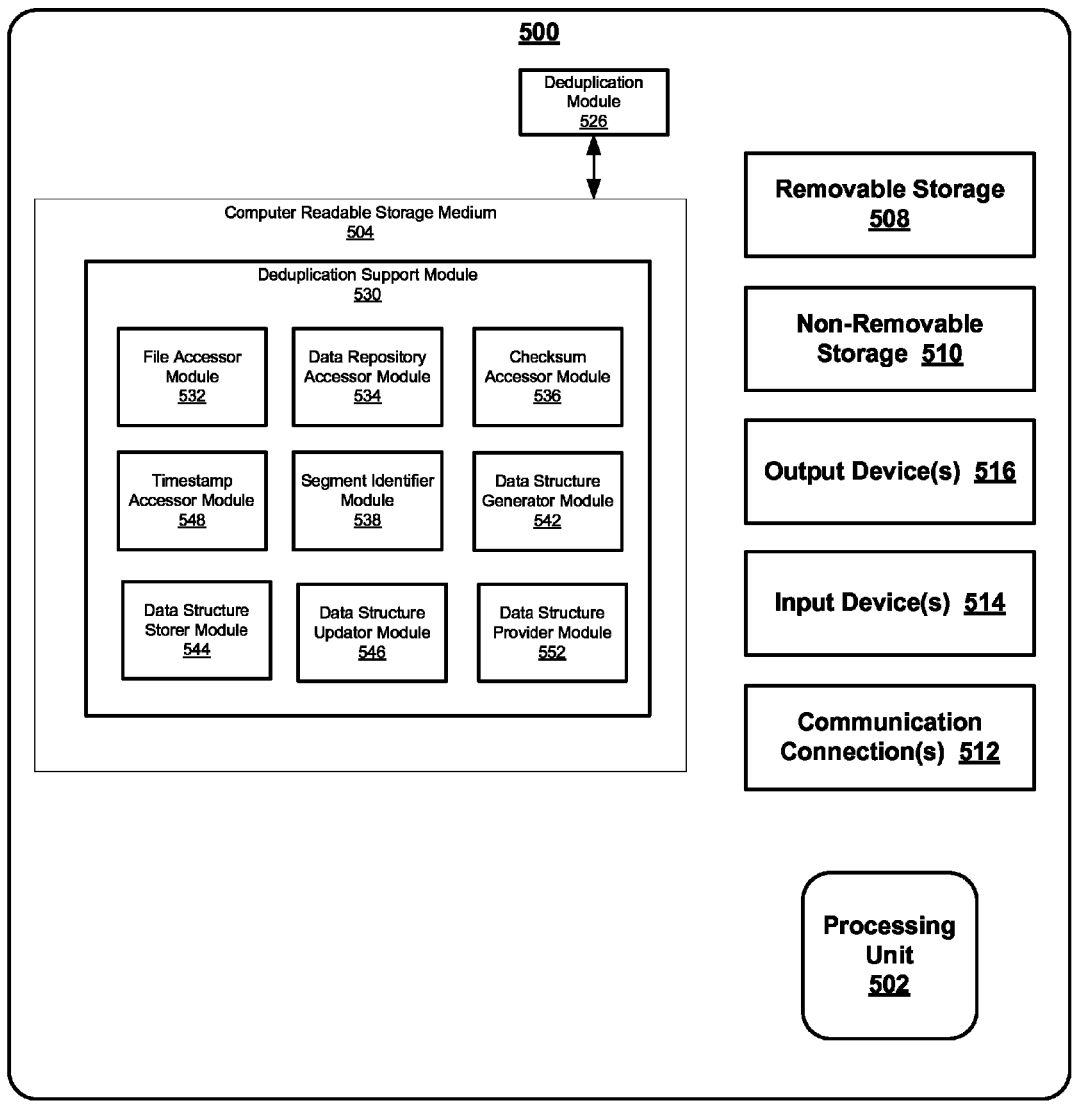
FIG. 5 shows a block diagram of an exemplary computer system in accordance with one embodiment of the present invention.

Referring now to FIG. 5, a block diagram of an exemplary computer system in accordance with one embodiment of the present invention is shown. With reference to FIG. 5, an exemplary system module for implementing embodiments includes a general purpose computing system environment, such as computing system environment 500. Computing system environment 500 may include, but is not limited to, servers (e.g., servers 106a-b), desktop computers, laptops, tablet PCs, mobile devices, and smartphones. In its most basic configuration, computing system environment 500 typically includes at least one processing unit 502 and computer readable storage medium 504. Depending on the exact configuration and type of computing system environment, computer readable storage medium 504 may be volatile (such as RAM), non-volatile (such as ROM, flash memory, etc.) or some combination of the two. Portions of computer readable storage medium 504 when executed facilitates providing file information related to deduplication process according to embodiments of the present invention (e.g., process 400).

Additionally, computing system environment 500 may also have additional features/functionality. For example, computing system environment 500 may also include additional storage (removable and/or non-removable) including, but not limited to, magnetic or optical disks or tape. Such additional storage is illustrated by removable storage 508 and non-removable storage 510. Computer storage media includes volatile and nonvolatile, removable and non-removable media implemented in any method or technology for storage of information such as computer readable instructions, data structures, program modules or other data. Computer readable medium 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 512 may allow computing system environment 500 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 512 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 500 may also have input device(s) 514 such as a keyboard, mouse, pen, voice input device, touch input device, remote control, etc. Output device(s) 516 such as a display, speakers, etc. may also be included. All these devices are well known in the art and are not discussed at length.

In one embodiment, computer readable storage medium 504 includes a deduplication support module 530. The deduplication support module 530 may be coupled to the deduplication module 526 that operates substantially similar to the deduplication unit 320. The deduplication support module 530 may include a file accessor module 532, a data repository accessor module 534, a checksum accessor module 536, a timestamp accessor module 548, a segment identifier module 538, a data structure generator module 542, a data structure storer module 544, a data structure updator module 546, and a data structure provider module 552.

It is appreciated that the file accessor module 532 is operable to access various files 210 and 240, for instance. The data repository accessor module 534 is operable to access the data repository, e.g., repository unit 332. The checksum accessor module 536 is operable to access checksum values by accessing the data repository. The timestamp accessor module 548 is operable to access the timestamp associated with each segment. The segment identifier module 538 is operable to identify segments that have a same checksum value. The data structure generator module 542 is operable to generate a data association structure, as discussed above with respect to FIGS. 2C and 2D. The structure storer module 544 is operable to store the generated data association structure. The data structure updator module 546 is operable to update the data association structure when a segment of a segment is altered. The data structure provider module 552 is operable to provide the data association structure to an application requesting access to a segment of a file that corresponds to the data association structure.

Figure 6:
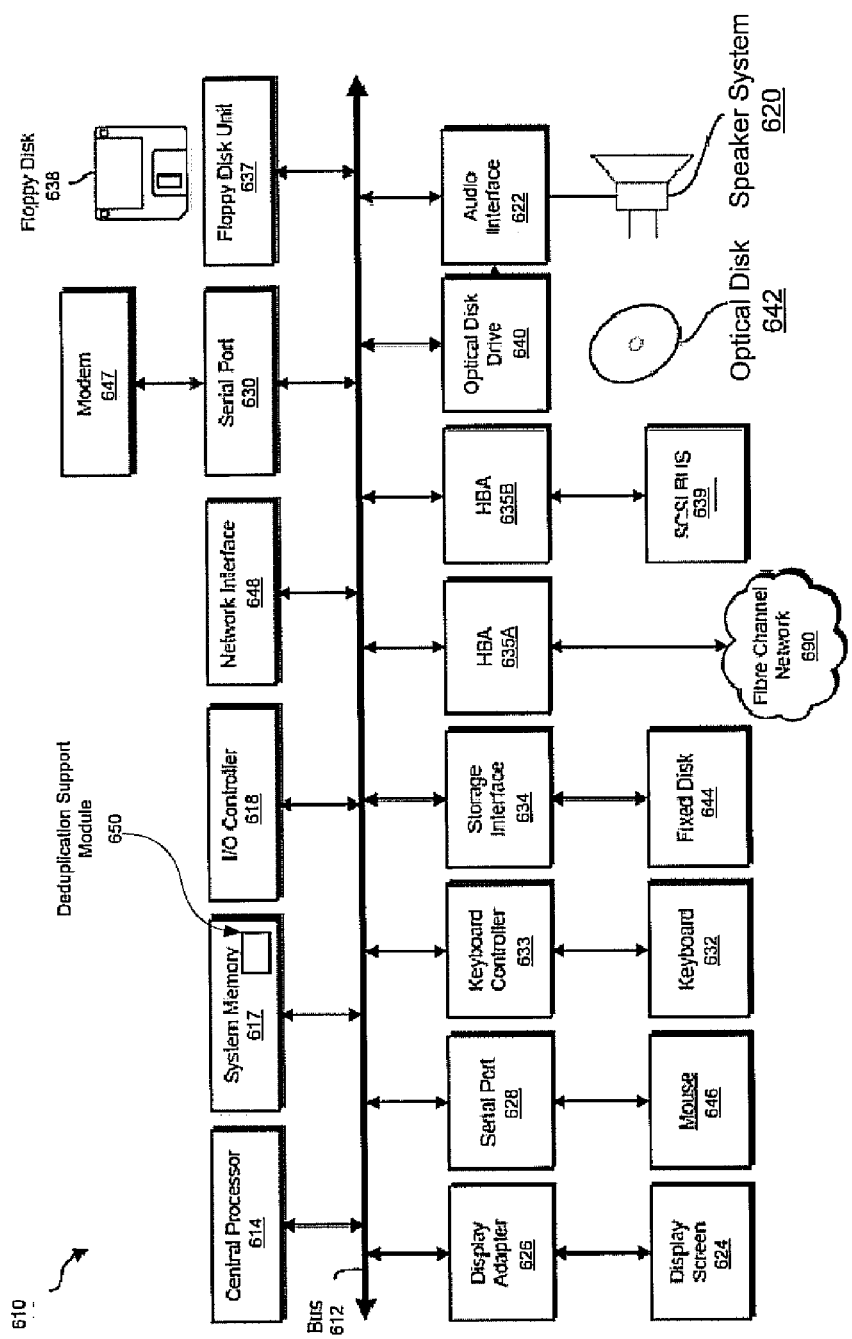
FIG. 6 shows a block diagram of another exemplary computer system in accordance with one embodiment of the present invention.

Referring now to FIG. 6, a block diagram of another exemplary computer system in accordance with one embodiment of the present invention is shown. FIG. 6 depicts a block diagram of a computer system 610 suitable for implementing the present disclosure. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (NBA) interface card 635A operative to connect with a Fibre Channel network 690, a host bus adapter (NBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612). System memory 617 includes deduplication support module 650 which is operable to provide file information relating to deduplication process according to embodiments of the present invention.

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Therefore, an external application accessing this data association structure can determine shared regions and/or determine if it has previously processed a given region and therefore the application can make efficient processing decisions from this information. Moreover, the interface application maintaining the data association structure frees an application from maintaining any state of what regions it has already processed, etc. In other words, the interface application, relieves external applications from maintaining and tracking the regions that are shared.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of providing file information relating to data deduplication in a computer system, comprising:
   accessing a plurality of files, wherein each file comprises a plurality of segments;
   accessing a data repository storing data resultant from a file deduplication process including accessing a plurality of checksum values associated with said plurality of segments, wherein a first application program performs said file deduplication process;
   identifying segments of said plurality of segments having a same checksum value;
   generating a data association structure by associating said segments of said plurality of segments having said same checksum value, wherein a first checksum value is operable as an index into said data association structure for obtaining segments having said first checksum value;
   storing, using a deduplication database, said data association structure;
   storing a plurality of respective timestamps associated with said plurality of segments, wherein each respective timestamp indicates a last time an associated segment was altered;
   accessing said stored data association structure in said computer memory by a second application program using a received application timestamp and accessing one or more segments of said plurality of segments having an associated timestamp of said plurality of respective timestamps that is newer than the received application timestamp, wherein the second application program identifies, using only said associated timestamp, one or more segments of said plurality of segments that are not processed by the second application program;
   receiving, by the second application program, a listing of files to which a segment of said one or more segments of said plurality of segments belongs; and
   comparing said listing of files against a defined subset of files to exclude from processing to further determine whether said segment needs to be processed.

2. The method as described in claim 1 wherein within said data association structure, each segment indicates a respective file to which each segment is associated.

3. The method as described by claim 1 further comprising:
   accessing said data repository to identify a new checksum value associated with an altered segment of said plurality of segments;
   updating said data association structure based on said new checksum value to form an updated data association structure; and
   storing said updated data association structure.

4. The method as described by claim 1, wherein said data association structure further comprises said plurality of time stamps associated with said plurality of checksum values.

5. The method as described by claim 4 further comprising:
   from said data repository, accessing a new time stamp associated with an altered segment of said plurality of segments;
   updating said data association structure to form an updated data association structure; and
   storing said updated data association structure.

6. The method as described by claim 1 further comprising:
   providing a portion of said data association structure to an application requesting access to a segment of said plurality of segments corresponding to said data association structure.

7. The method as described by claim 1 further comprising:
   accessing a new file comprising a plurality of segments;
   from said data repository, accessing a plurality of respective checksum values associated with said plurality of segments of said new file;
   identifying segments of said new file and segments of said plurality of files having a same checksum value;
   associating segments having a same checksum value to one another based on said identifying segments of said new file and segments of said plurality of files having a same checksum value to form an updated data association structure; and
   storing said updated data association structure.

8. The method as described by claim 1 wherein storing said plurality of respective timestamps associated with said plurality of segments comprises storing said plurality of respective timestamps in said data association structure.

9. A non-transitory computer readable storage medium having stored thereon computer executable instructions that, if executed by a computer system, cause the computer system to perform a method of providing file information relating to data deduplication, said method comprising:
   accessing a plurality of files, wherein each file comprises a plurality of segments;
   accessing a data repository storing data resultant from a file deduplication process including accessing a plurality of checksum values associated with said plurality of segments, wherein a first application program performs said file deduplication process;
   identifying segments of said plurality of segments having a same checksum value;
   generating a data association structure by associating said segments of said plurality of segments having said same checksum value, wherein a first checksum value is operable as an index into said data association structure for obtaining segments having said first checksum value, and wherein, within said data association structure, each segment indicates a respective file to which each segment is associated;
   storing, using a deduplication database, said data association structure;
   storing a plurality of respective time stamps associated with said plurality of segments, wherein each respective time stamp indicates a last time an associated segment was altered;
   accessing said stored data association structure in said computer memory by a second application program using a received application timestamp and accessing one or more segments of said plurality of segments having an associated timestamp of said plurality of respective time stamps that is newer than the received application timestamp, wherein the second application program identifies, using only said respective timestamps, one or more segments of said plurality of segments that are not processed by the second application program;
   receiving, by the second application program, a listing of files to which a segment of said one or more segments of said plurality of segments belongs; and
   comparing said listing of files against a defined subset of files to exclude from processing to further determine whether said segment needs to be processed.

10. The non-transitory computer readable storage medium as described by claim 9 wherein said method further comprises:
- accessing said data repository to identify a new checksum value associated with an altered segment of said plurality of segments;
- updating said data association structure based on said new checksum value to form an
- updated data association structure; and
- storing said updated data association structure.

11. The non-transitory computer readable storage medium as described by claim 9, wherein said data association structure further comprises said plurality of time stamps associated with said plurality of checksum values.

12. The non-transitory computer readable storage medium as described by claim 11 wherein said method further comprises:
- from said data repository, accessing a new time stamp associated with an altered segment of said plurality of segments;
- updating said data association structure to form an updated data association structure; and
- storing said updated data association structure.

13. The non-transitory computer readable storage medium as described by claim 9 wherein said method further comprises:
- providing a portion of said data association structure to an application requesting access to a segment of said plurality of segments corresponding to said data association structure.

14. The non-transitory computer readable storage medium as described by claim 9 wherein said method further comprises:
- accessing a new file comprising a plurality of segments;
- from said data repository, accessing a plurality of respective checksum values associated with said plurality of segments of said new file;
- identifying segments of said new file and segments of said plurality of files having a same checksum value;
- associating segments having a same checksum value to one another based on said identifying segments of said new file and segments of said plurality of files having a same checksum value to form an updated data association structure; and storing said updated data association structure;
- storing a plurality of respective time stamps associated with said segments, wherein each respective time stamp indicates a last time an associated segment was altered; and
- accessing said stored data association using a received application timestamp, wherein accessing said stored data association comprises accessing one or more segments of said plurality of segments having a newer associated timestamp of said plurality of respective time stamps than the received application timestamp.

15. The non-transitory computer readable storage medium as described by claim 9 wherein storing said plurality of respective time stamps associated with said plurality of segments comprises storing a plurality of respective time stamps in said data association structure.

16. A method of providing information relating to a deduplication process in a computer system, said method comprising:
- generating a segment index data structure responsive to performing a data deduplication process on a plurality of files of a file system, wherein each file of said plurality of files comprises a plurality of segments and wherein said segment index data structure comprises a listing of unique segments within said plurality of segments, and wherein a first application performs said data deduplication process;
- storing, using a deduplication database, a plurality of respective time stamps associated with said plurality of segments, wherein each respective time stamp indicates a last time an associated segment was altered;
- receiving a request from a requesting application for segment information;
- responsive to said request, scanning said segment index data structure;
- responsive to said scanning, supplying segment information to said requesting application, wherein said request includes an application timestamp indicating a last time said requesting application processed data within said file system, and wherein said scanning comprises scanning only respective segments of said segment index data structure having respective timestamps of said plurality of respective time stamps having a time after said application timestamp, wherein the requesting application identifies, using only said respective timestamps, one or more segments of said respective segments that are not processed by the requesting application;
- receiving, by the second application program, a listing of files to which a segment of said one or more segments of said plurality of segments belongs; and
- comparing said listing of files against a defined subset of files to exclude from processing to further determine whether said segment needs to be processed.

17. The method as described in claim 16 wherein said segment information comprises, for each respective segment, a segment identifier and a list of files to which said respective segment belongs and further comprising said requesting application using said segment information to determine whether or not to process respective segments.

18. The method as described in claim 16 wherein said scanning and said supplying are performed iteratively.

19. The method as described in claim 16 wherein said unique segments are identified by respective unique checksum values and wherein further said segment index data structure resides within a repository unit of a data deduplication unit.

20. The method as described in claim 16 wherein storing said plurality of respective time stamps associated with said plurality of segments comprises storing said plurality of respective time stamps in said segment index data structure.

\* \* \* \* \*